(12) United States Patent
Dustin et al.

(10) Patent No.: US 11,746,262 B2
(45) Date of Patent: Sep. 5, 2023

(54) PHTHALONITRILE ADHESIVE FORMULATIONS AND RELATED METHODS

(71) Applicant: The Boeing Company, Chicago, IL (US)

(72) Inventors: Ashley M. Dustin, Los Angeles, CA (US); Andrew P. Nowak, Los Angeles, CA (US); Gregory P. Nowak, Swansea, IL (US); Kevin J. Drummey, Los Angeles, CA (US); Michael Ventuleth, Camarillo, CA (US)

(73) Assignee: The Boeing Company, Chicago, IL (US)

( * ) Notice: Subject to any disclaimer, the term of this patent is extended or adjusted under 35 U.S.C. 154(b) by 709 days.

(21) Appl. No.: 16/863,052

(22) Filed: Apr. 30, 2020

(65) Prior Publication Data

US 2021/0340413 A1   Nov. 4, 2021

(51) Int. Cl.
| | |
|---|---|
| *C09J 11/06* | (2006.01) |
| *C09J 179/02* | (2006.01) |
| *C08K 5/315* | (2006.01) |
| *C08K 3/013* | (2018.01) |
| *C08G 73/02* | (2006.01) |
| *C08K 5/00* | (2006.01) |

(52) U.S. Cl.
CPC ............ *C09J 11/06* (2013.01); *C08G 73/024* (2013.01); *C08K 5/315* (2013.01); *C09J 179/02* (2013.01); *C08K 3/013* (2018.01); *C08K 5/0025* (2013.01)

(58) Field of Classification Search
None
See application file for complete search history.

(56) References Cited

U.S. PATENT DOCUMENTS

| | | |
|---|---|---|
| 5,242,755 A | 9/1993 | Keller et al. |
| 8,222,403 B2 | 7/2012 | Laskoski et al. |
| 8,921,510 B1 | 12/2014 | Keller et al. |
| 2006/0194944 A1 | 8/2006 | Fowler et al. |
| 2017/0002146 A1 | 1/2017 | Keller et al. |

FOREIGN PATENT DOCUMENTS

| | | | |
|---|---|---|---|
| WO | WO 2014/021946 A | | 2/2014 |
| WO | WO 2016/100259 A | | 6/2016 |
| WO | WO 2018/0175025 | * | 9/2018 |
| WO | WO 2018/175025 A | | 9/2018 |

OTHER PUBLICATIONS

Sheng et al., "Synthesis of high performance bisphthalonitrile resins cured with self-catalyzed 4-aminophenoxy phthalonitrile," Thermochimica Acta 577 (2014) 17-24.

Patel et al., "Mechanism of thermal decomposition of poly(ether ether ketone) (PEEK) from a review of decomposition studies," Polymer Degradation and Stability 95, pp. 709-718, May 2010.

* cited by examiner

*Primary Examiner* — Sheeba Ahmed
(74) *Attorney, Agent, or Firm* — BELL & MANNING, LLC (57) ABSTRACT

Provided herein are phthalonitrile adhesive formulations and methods of making and using the adhesive formulations. An illustrative adhesive formulation comprises a phthalonitrile additive selected from a group consisting of 1,2-dicyanobenzene; a derivative of 1,2-dicyanobenzene; and combinations thereof; a bisphthalonitrile compound; and a curing agent; wherein the phthalonitrile additive does not comprise an ether functional group and does not comprise a thioether functional group.

28 Claims, 4 Drawing Sheets

FIG. 1A

4-phenylureaphthalonitrile

Methylene diphenylureaphthalonitrile 4-aminophthalonitrile

Toluene bisureaphthalonitrile

PHTHALONITRILE ADHESIVE FORMULATIONS AND RELATED METHODS

BACKGROUND

High temperature adhesives are of interest in many applications, including transportation (e.g., aerospace). Polyimide and phthalonitrile adhesives have been developed for such applications. Regarding phthalonitrile adhesives, the rigid and planar phthalonitrile moieties provide the resulting polymer networks with a high melting temperature. However, such moieties also tend to make phthalonitrile adhesives difficult to process. As a result, different types of phthalonitrile adhesives have been developed, including polyetheretherketone (PEEK)-based phthalonitriles, which exhibit improved solubility and processability. However, in view of the limited number of adhesives capable of performing under high operating temperatures, additional adhesives are desirable.

SUMMARY

Provided herein are phthalonitrile adhesive formulations and methods of making and using the adhesive formulations. The adhesive formulations comprise a bisphthalonitrile compound and certain phthalonitrile additives. At least some embodiments of the adhesive formulations provide thermoset polymers exhibiting improved thermooxidative stability, rendering them excellent for use under high temperature conditions. In addition, at least some embodiments of the adhesive formulations exhibit increased viscosities, facilitating their use in a variety of applications such as impregnation and coating applications.

An embodiment 1 is provided which is an adhesive formulation comprising: a phthalonitrile additive selected from a group consisting of 1,2-dicyanobenzene; a derivative of 1,2-dicyanobenzene; and combinations thereof; a bisphthalonitrile compound; and a curing agent, wherein the phthalonitrile additive does not comprise an ether functional group and does not comprise a thioether functional group.

An embodiment 2 is provided which is an adhesive formulation according to embodiment 1, wherein the derivative comprises at least one phthalonitrile moiety and a functional group.

An embodiment 3 is provided which is an adhesive formulation according to embodiment 2, wherein the functional group comprises a hydrogen bond donor.

An embodiment 4 is provided which is an adhesive formulation according to embodiment 3, wherein the hydrogen bond donor is an N—H bond of the functional group.

An embodiment 5 is provided which is an adhesive formulation according to any of embodiments 2-4, wherein the functional group comprises an amine group; an amide group; an oxalamide group; a urea group; a urethane group; or combinations thereof.

An embodiment 6 is provided which is an adhesive formulation according to any of embodiments 2-5, wherein the functional group is monofunctional.

An embodiment 7 is provided which is an adhesive formulation according to any of embodiments 2-5, wherein the functional group is multifunctional comprising one or more of the amine group; the amide group; the oxalamide group; the urea group; the urethane group; or combinations thereof.

An embodiment 8 is provided which is an adhesive formulation according to any of embodiments 1-7, wherein the phthalonitrile additive comprises a single phthalonitrile moiety or two phthalonitrile moieties.

An embodiment 9 is provided which is an adhesive formulation according to any of embodiments 1-8, wherein the phthalonitrile additive is selected from a group consisting of 1,2-dicyanobenzene; 4-aminophthalonitrile; 4-phenylureaphthalonitrile; toluene bisureaphthalonitrile; methylene diphenylureaphthalonitrile; and combinations thereof.

An embodiment 10 is provided which is an adhesive formulation according to any of embodiments 1-9, wherein the phthalonitrile additive is present in the adhesive formulation at an amount in a range of from 2 mol % to 30 mol %.

An embodiment 11 is provided which is an adhesive formulation according to any of embodiments 1-10, wherein the bisphthalonitrile compound is an oligomer.

An embodiment 12 is provided which is an adhesive formulation according to any of embodiments 1-11, wherein the bisphthalonitrile compound comprises an aromatic ether linking group and a ketone linking group.

An embodiment 13 is provided which is an adhesive formulation according to embodiment 12, wherein the aromatic linking group is provided by a bisphenol and the ketone linking group is provided by a benzophenone.

An embodiment 14 is provided which is an adhesive formulation according to any of embodiments 1-13, wherein a portion of the phthalonitrile moieties in the adhesive formulation are crosslinked to form a prepolymer of the phthalonitrile additive and the bisphthalonitrile compound in the adhesive formulation.

An embodiment 15 is provided which is an adhesive formulation comprising a phthalonitrile additive selected from a group consisting of 1,2-dicyanobenzene; a derivative of 1,2-dicyanobenzene; and combinations thereof; a bisphthalonitrile compound; a curing agent; a prepolymer of the phthalonitrile additive and the bisphthalonitrile compound; and a solvent, wherein the phthalonitrile additive does not comprise an ether functional group and does not comprise a thioether functional group.

An embodiment 16 is provided which is an adhesive formulation according to embodiment 15, wherein the derivative comprises at least one phthalonitrile moiety and a functional group.

An embodiment 17 is provided which is an adhesive formulation according to embodiment 16, wherein the functional group comprises a hydrogen bond donor.

An embodiment 18 is provided which is an adhesive formulation according to any of embodiments 15-17, characterized by a shear viscosity which is at least 1.5 times greater than that of a comparative adhesive formulation that does not comprise the phthalonitrile additive.

An embodiment 19 is provided which is an adhesive formulation according to any of embodiments 15-17, characterized by a shear viscosity in a range of from 1,000 cP. to 100,000 cP.

An embodiment 20 is provided which is an adhesive formulation according to any of embodiments 15-19, wherein the prepolymer, together with the phthalonitrile additive, the bisphthalonitrile compound, and the curing agent, are present at an amount in a range of from 25 weight % to 80 weight %.

An embodiment 21 is provided which is an adhesive formulation according to any of embodiments 15-20, further comprising an additive selected from a group consisting of a filler, a dispersant, a flow agent, a cure promoter, and a surfactant.

An embodiment 22 is provided which is an adhesive formulation according to any of embodiments 15-21, further comprising a filler having an aspect ratio of greater than 2.

An embodiment 23 is provided which is a prepreg comprising a fibrous material and the adhesive formulation according to any of the embodiments 1-22 impregnated into the fibrous material.

An embodiment 24 is provided which is an adhesive article comprising a substrate and a layer of the adhesive formulation according to any of the embodiments 1-22 on a surface of the substrate.

An embodiment 25 is provided which is a thermoset polymer formed by curing the adhesive formulation according to any of the embodiments 1-22.

An embodiment 26 is provided which is a method of using the adhesive formulation according to any of embodiments 1-14, the method comprising heating the adhesive formulation at a temperature and for a period of time to achieve partial curing of the phthalonitrile additive and the bisphthalonitrile compound to form a prepolymer; and adding a solvent.

An embodiment 27 is provide which is a of using the adhesive formulation according to any of embodiments 15-22, comprising heating the adhesive formulation according to a curing profile to form a thermoset polymer.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

DETAILED DESCRIPTION

Provided herein are phthalonitrile adhesive formulations and methods of making and using the adhesive formulations.

Definitions

Alkyl group refers to a linear, branched or cyclic alkyl group in which the number of carbons may range from, e.g., 1 to 24, 1 to 12, 1 to 6, or 1 to 4. The alkyl group may be unsubstituted, by which it is meant the alkyl group contains no heteroatoms. The alkyl group may be substituted, by which it is meant an unsubstituted alkyl group in which one or more bonds to a carbon(s) or hydrogen(s) are replaced by a bond to non-hydrogen and non-carbon atoms.

Alkenyl group refers to a mono- or polyunsaturated, linear, branched or cyclic alkenyl group in which the number of carbons may range from, e.g., 2 to 24, 2 to 12, 2 to 6, etc. The alkenyl group may be unsubstituted or substituted as described above with respect to alkyl groups.

Aryl group refers to a monocyclic aryl group having one aromatic ring or a polycyclic group having fused aromatic rings (e.g., two, three, etc. rings). Monocyclic aryl groups may be unsubstituted or substituted as described above with respect to alkyl groups. However, substituted monocyclic aryl groups also refer to an unsubstituted monocyclic aryl group in which one or more carbon atoms are bonded to an unsubstituted or substituted alkane, an unsubstituted or substituted alkene, or an unsubstituted or substituted monocyclic aryl group or a polycyclic aryl group. The meaning of unsubstituted and substituted alkanes and unsubstituted and substituted alkenes follows the meaning described above for unsubstituted and substituted alkyl and alkenyl groups, respectively. Polycyclic aryl groups are unsubstituted.

A phthalonitrile moiety refers to a portion of a molecule, compound, and the like, the portion having the following structure:

The term "crosslink" and the like refers to covalent bonds formed between cyano groups on different phthalonitrile moieties induced by heat and generally, a curing agent.

The present phthalonitrile adhesive formulations comprise a phthalonitrile additive, a bisphthalonitrile compound, and a curing agent. As further described below, at least in embodiments, the phthalonitrile additives improve the thermooxidative stability of the thermoset polymers formed from the adhesive formulations. At least in embodiments, the phthalonitrile additives increase the viscosity of the adhesive formulations, which is advantageous for a variety of applications. This is very different from existing approaches of using additives in order to reduce the viscosity of phthalonitrile compositions.

Phthalonitrile Additives

The present phthalonitrile additives include 1,2-dicyanobenzene and derivatives thereof. The additives are small molecules and are distinguished from the oligomers, prepolymers, and thermoset polymers described herein. Derivatives of 1,2-dicyanobenzene comprise the phthalonitrile moiety from 1,2-dicyanobenzene, but may also comprise at least one additional phthalonitrile moiety. In embodiments, the derivative comprises a single phthalonitrile moiety (i.e., only one such moiety). In embodiments, the derivative comprises two phthalonitrile moieties (i.e., only two such moieties), which may be terminal phthalonitrile moieties. Derivatives of 1,2-dicyanobenzene also comprise at least one functional group, which may be directly covalently bound to the benzene ring of a phthalonitrile moiety. However, the derivatives do not comprise an ether functional group (RO—) and do not comprise a thioether functional group (RS—). In these formulas, "R" is generally an alkyl group or an aryl group, both of which have been defined above. The "—" denotes the covalent linkage to a phthalonitrile moiety, which may be a direct covalent linkage.

The functional group of the derivatives of 1,2-dicyanobenzene may be a functional group comprising a hydrogen bond donor, which is a hydrogen atom covalently bound to an electronegative atom of the functional group. In embodiments, the electronegative atom of the functional group is N and the hydrogen bond donor is an N—H bond of the functional group. This and similar hydrogen bond donors are capable of forming hydrogen bonds with hydrogen bond acceptor(s) (e.g., :O) present in the bisphthalonitrile compound (or in a prepolymer or thermoset polymer thereof). Without wishing to be bound to any particular theory, it is believed that use of such functional groups serves to increase the viscosity of the adhesive formulations. Use of such functional groups and phthalonitrile additives represents an entirely different approach to phthalonitrile-based adhesives. Existing approaches have used various additives to reduce the viscosity of such adhesives.

Illustrative functional groups comprising a hydrogen bond donor include an amine group (e.g., $HR_1N$—), wherein $R_1$ is hydrogen, an alkyl group as defined above, or an aryl group as defined above; a urea group (e.g., $R_2NHC(O)NH$—), wherein $R_2$ is hydrogen, an alkyl group as defined above, or an aryl group as defined above; a urethane group (e.g., $R_3NHC(O)O$— or —$NHC(O)OR_3$), wherein $R_3$ is hydrogen, an alkyl group as defined above, or an aryl group as defined above; an amide group (e.g., $R_4C(O)NH$— or —$C(O)NHR_4$), wherein $R_4$ is a hydrogen, an alkyl group as defined above, or an aryl group as defined above; and an oxalamide group (e.g., $R_5HNC(O)C(O)NH$—), wherein $R_5$ is a hydrogen, an alkyl group as defined above, or an aryl group as defined above. In each case, the "—" denotes the covalent linkage to the phthalonitrile moiety, which may be a direct covalent linkage.

Some derivatives of 1,2-dicyanobenzene comprising the functional groups described above are commercially available, while others may be formed using known synthetic methods involving functionalizing 1,2-dicyanobenzene. By way of example, 4-aminophthalonitrile is a commercially available derivative. Certain derivatives of 1,2-dicyanobenzene may be formed by reacting 4-aminophthalonitrile with an amine-reactive molecule such as an isocyanate to provide the urea group described above. Another amine-reactive molecule is a carboxylic acid (or ester thereof) which may be used to provide the amide group described above. Another amine-reactive molecule is an oxalate which may be used to provide the oxalamide group described above. As another example, 4-hydroxyphthalonitrile is commercially available and may be combined with a hydroxy-reactive molecule such as an isocyanate to provide the urethane group described above. These examples illustrate how a variety of types of isocyanates, carboxylic acids (or esters thereof), oxalates, etc. may be used to provide a variety of derivatives of 1,2-dicyanobenzene comprising the functional groups described above.

The functional group comprising a hydrogen bond donor may be monofunctional comprising a single amine group, urea group, etc. However, the functional group may be multifunctional comprising more than one amine group, urea group, etc. This may be accomplished using functionalization reactions analogous to those described above, but using a multifunctional molecule to react with 1,2-dicyanobenzene, e.g., a diisocyanate, to provide derivatives of 1,2-dicyanobenzene comprising two phthalonitrile moieties and two urea groups (e.g., —$HN(O)CHNR_2NHC(O)NH$—), wherein $R_2$ is as defined above. Again, the "—" denotes the covalent linkage to the phthalonitrile moieties, which may be direct covalent linkages. Analogous reactions may be used to provide difunctional derivatives with two phthalonitrile moieties and two urethane groups, two amide groups, or two oxalamide groups.

Figure 1A:
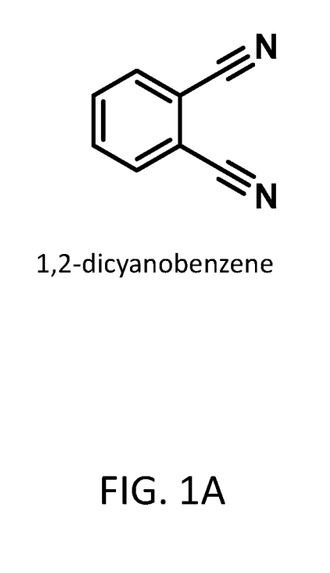
FIGS. 1A and 1B show structures of illustrative phthalonitrile additives.
Figure 1B:
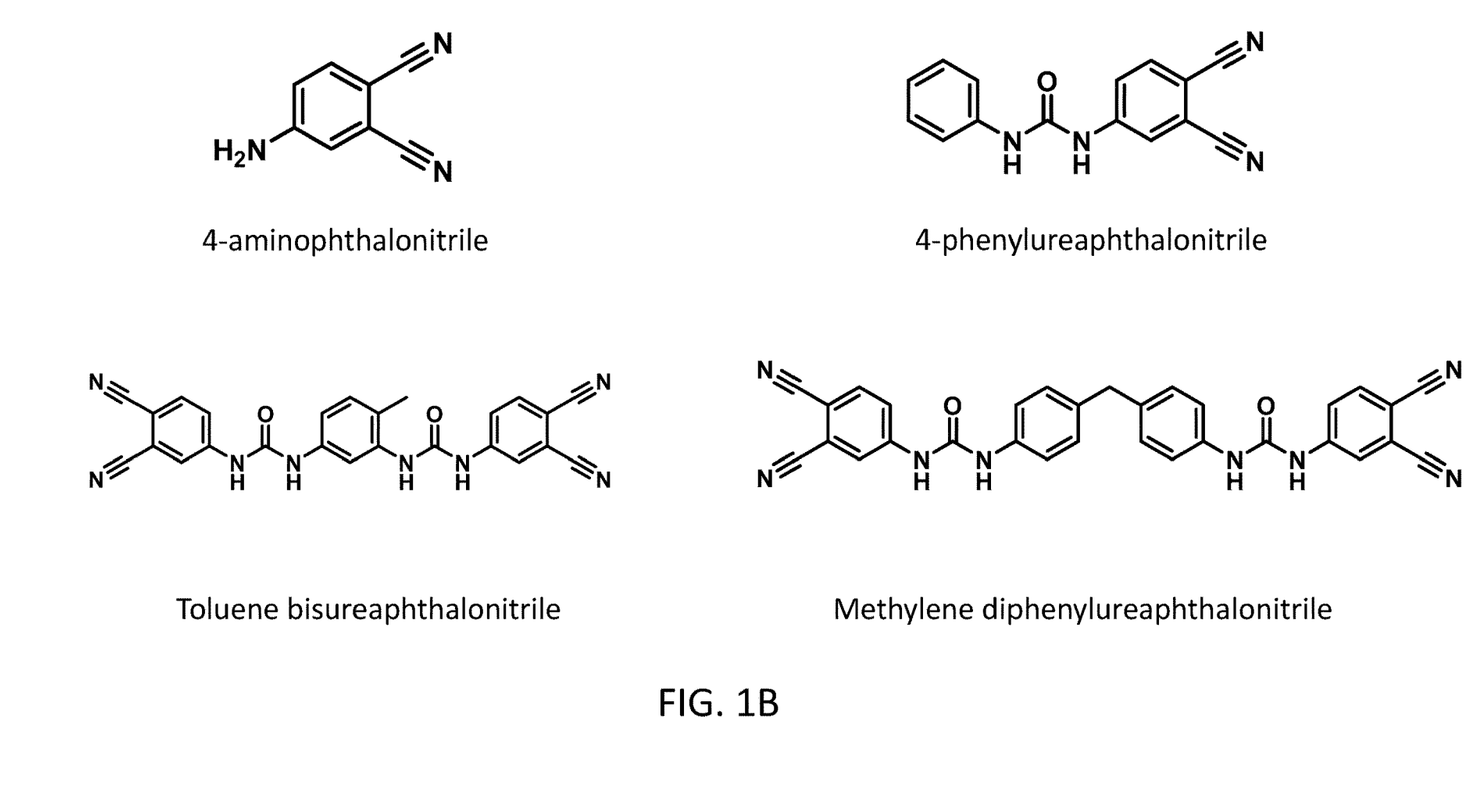

The phthalonitrile additive 1,2-dicyanobenzene is shown in FIG. 1A and illustrative derivatives of 1,2-dicyanobenzene are shown in FIG. 1B. Thus, illustrative phthalonitrile additives include 1,2-dicyanobenzene; 4-aminophthalonitrile; 4-phenylureaphthalonitrile; toluene bisureaphthalonitrile; and methylene diphenylureaphthalonitrile. Combinations of different types of phthalonitrile additives may be used in the adhesive formulations.

Bisphthalonitrile Compounds

A variety of types of bisphthalonitrile compounds may be used in the phthalonitrile adhesive formulations. Similarly, combinations of different types of bisphthalonitrile compounds may be used in the adhesive formulations. The bisphthalonitrile compound comprises two terminal phthalonitrile moieties which are connected via one or more linking groups such as an aromatic ether, a thioether, an imide, a sulfone, a heterocyclic ether, an aromatic ketone, a urethane, a urea, an amide, an ester, an oxamide, and combinations thereof. Such bisphthalonitrile compounds are commercially available or may be formed using known synthetic methods. The synthetic methods used to provide such bisphthalonitrile compounds generally result in different numbers of the linking group(s) being incorporated into the bisphthalonitrile compounds between the two terminal phthalonitrile moieties and a corresponding distribution of molecular weights. Thus, in the present disclosure, the phrase "bisphthalonitrile compound" may be referred to as an "oligomer" and the like. Similarly, the phrase encompasses each of the bisphthalonitrile compounds formed by such a synthetic method, each of which may have a different number of the linking group(s) and a different molecular weight. However, the phrase "bisphthalonitrile compound" also encompasses a small molecule, provided the bisphthalonitrile compound is a different compound from the selected phthalonitrile additive. Illustrative bisphthalonitrile compounds include those described in U.S. Pat. No. 8,222,403; U.S. Pat. Pub. No. 20170002146; International Pat. Pub. No. 2014021946; and International Pat. Pub. No. 2018175025; the disclosures of each of which are incorporated by reference for purposes of the bisphthalonitrile compounds.

Figure 2:
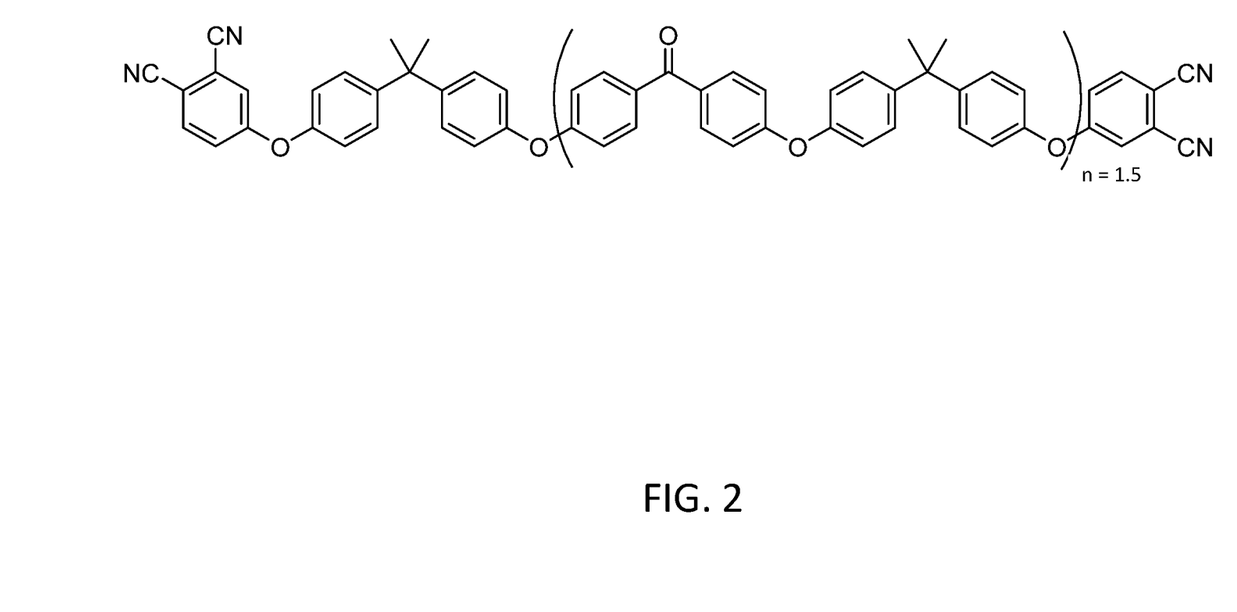
FIG. 2 shows a structure of an illustrative bisphthalonitrile compound.

In embodiments, the bisphthalonitrile compound comprises at least one aromatic ether linking group and at least one aromatic ketone linking group between the two terminal phthalonitrile moieties. Such bisphthalonitrile compounds may be formed using known synthetic methods, e.g., involving the reaction of a dihydroxyaromatic with a dihaloaromatic such as dihalobenzophenone, followed by endcapping with 4-nitrophthalonitrile. An illustrative such bisphthalonitrile compound is shown in FIG. 2, formed using bisphenol A as the dihydroxyaromatic and dichlorobenzophenone as the dihaloaromatic. As is shown, the average value of n is 1.5. Such a bisphthalonitrile compound may be obtained commercially, e.g., Bis A Oligomeric Phthalonitrile Composition from the Naval Research Laboratory. However, other similar bisphthalonitrile compounds may be used, e.g., those based on other dihydroxyaromatics, including other bisphenols. Illustrative dihydroxyaromatics include bisphenol A6F, resorcinol, 2,2-bis(4-hydroxyphenyl)propane, 2,2-bis(4-hydroxyphenyl)-1,1,1,3,3,3-hexafluoropropane, and the like.

The amount of the phthalonitrile additive in the phthalonitrile adhesive formulations may be selected to provide a desired amount (e.g., maximum) of crosslinking (described further below) in a thermoset polymer formed therefrom. It has been found that amounts in a range of from 2 mol % to 30 mol %, including from 2 mol % to 25 mol %, from 5 mol % to 20 mol %, and from 5 mol % to 15 mol % are particularly useful. The term "mol %" refers to the mole percentage of the phthalonitrile additive as compared to the total moles of the phthalonitrile additive and the bisphthalonitrile compound in the adhesive formulation. When multiple phthalonitrile additives and/or bisphthalonitrile compounds are used, these mole percentages refer to the total moles of the multiple phthalonitrile additives and the total moles of the multiple bisphthalonitrile compounds.

Curing Agents

A variety of types of curing agents may be used in the phthalonitrile adhesive formulations, provided the curing agent is capable of inducing crosslinking reactions between phthalonitrile moieties, i.e. reactions between cyano groups on phthalonitrile moieties to form covalent crosslinks. These covalent crosslinks may include polytriazine-type, polyindoline-type, phthalocyanine-type crosslinks, and combinations thereof. Combinations of different types of curing agents may be used in the adhesive formulations.

Illustrative curing agents include amines, diamines, phenolics, acids, metals, metal salts, and combinations thereof. Regarding diamines, illustrative curing agents include 4,4'-(1,3-phenylenedioxy)dianiline; 4,4'-(1,4-phenylenedioxy)dianiline; bis[4-(4-aminophenoxy)phenyl]sulfone; 4,4'-(4,4'-isopropylidenediphenyl-1,1'-diyldioxy)dianiline; 4,4'-(1,3-phenylenediisopropylidene)dianiline; phenylenediisopropylidene)dianiline; 1'-biphenyl-4,4'-diyldioxy)dianiline, 4,4'-methylenedianiline; 4,4'-sulphonyldianiline; 4,4'-methylene-bis(2-methylaniline); 3,3'-methylenedianiline; 3,4'-methylenedianiline; 4,4'-oxydianiline; 4,4'-(isopropylidene)dianiline; 4,4'-(hexafluoroisopropylidene)dianiline; 4,4'-(hexafluoroisopropylidene)bis(p-phenyleneoxy)dianiline; and 4,4'-diaminobenzophenone. Other illustrative curing agents include those described in U.S. Pat. Nos. 4,408,035; 4,410,676; 5,247,060; 8,735,532; 8,921,510; and International Pat. Pub. No. 2014021946; the disclosures of each of which are incorporated by reference for purposes of the curing agents.

Although certain of the phthalonitrile additives may be capable of catalyzing crosslinking reactions between phthalonitrile moieties, the curing agent in the phthalonitrile adhesive formulations is generally not a phthalonitrile compound, i.e., generally does not have any phthalonitrile moieties. Thus, the curing agent and the phthalonitrile additive are different compounds in the adhesive formulations.

The amount of the curing agent in the phthalonitrile adhesive formulations may be in a range of from 1 weight % to 10 weight %, including from 2 weight % to 8 weight %, and from 2 weight % to 5 weight % as compared to the total weight of the adhesive formulation. When multiple curing agents are used, these weight percentages refer to the total weight of the multiple curing agents.

In embodiments, the phthalonitrile moieties in the phthalonitrile adhesive formulations (i.e., those of the phthalonitrile additive and the bisphthalonitrile compound) are uncrosslinked, by which it is meant the phthalonitrile additive, the bisphthalonitrile compound, and the curing agent have not been exposed to conditions to induce such crosslinking reactions to provide the resulting covalent crosslinks described above. This does not necessarily mean that there are no such crosslinks in the adhesive formulation, but that the amount is too small to have a material effect on the adhesive formulation.

In other embodiments, however, a portion (less than all) of the phthalonitrile moieties in the phthalonitrile adhesive formulations are crosslinked. This may be accomplished by exposing the phthalonitrile additive, the bisphthalonitrile compound, and the curing agent to conditions to induce crosslinking reactions so as to achieve partial curing. Conditions to achieve partial curing are different than those used to convert the adhesive formulation into a thermoset polymer, and involve lower temperatures and/or shorter times. Thus, the number of covalent crosslinks, i.e., the degree of crosslinking, achieved during partial curing is less than in the thermoset polymer. Although the conditions to achieve partial curing will depend upon the type of phthalonitrile additive, the bisphthalonitrile compound, and the curing agent, illustrative conditions include heating at a temperature of no more than 250° C. for no more than 120 minutes. This includes a temperature in a range of from 175° C. to 250° C. or 190° C. to 210° C. for from 20 minutes to 120 minutes or from 80 minutes to 100 minutes.

The result of partial curing converts a portion (less than all) of the phthalonitrile additive and a portion (less than all) the bisphthalonitrile compound to a prepolymer comprising the covalent crosslinks described above. However, uncrosslinked phthalonitrile additive, uncrosslinked bisphthalonitrile compound, and unreacted curing agent also remain. For embodiments of the adhesive formulation comprising a prepolymer, the amount of the prepolymer may be selected depending upon the desired use for the adhesive formulation. In embodiments, the amount is in a range of from 25 weight % to 100 weight %, including from 25 weight % to 80 weight %, from 30 weight % to 75 weight %, and from 35 weight % to 65 weight % as compared to the total weight of the adhesive formulation. With respect to these amounts, the term "prepolymer" may encompass both crosslinked and uncrosslinked/unreacted components resulting from the partial curing.

Optional Solvent

The present phthalonitrile adhesive formulations may be in the form of a solid. The term "solid" encompasses various morphologies including particles, powder, and the like. However, in embodiments, the adhesive formulation further comprises a solvent. Terms such as paste, slurry, and the like may be used to characterize adhesive formulations comprising a solvent. A variety of types of solvents may be used. Illustrative solvents include alcohols and ketones such as 2-phenoxyethanol, acetone, 2-butanone, and 4-methyl-2-pentanone. Combinations of different types of solvents may be used. The amount of solvent may be selected depending upon the desired use for the adhesive formulation. In embodiments, the solvent is present in an amount of from 20 weight % to 75 weight %, including from 25 weight % to 70 weight %, and from 30 weight % to 60 weight % as compared to the total weight of the adhesive formulation. When multiple solvents are used, these weight percentages refer to the total weight of the multiple solvents.

Optional Additives

The present phthalonitrile adhesive formulations may comprise a variety of other optional additives, including fillers. Fillers are generally non-reactive with respect to the phthalonitrile additive and the bisphthalonitrile compound, but rather may be added to tune the properties of the adhesive formulation and the thermoset polymer formed therefrom. Thus, the types of fillers used and their amounts may be selected depending upon the desired use for the adhesive formulation and the thermoset polymer. Combinations of different types of fillers may be used.

Illustrative fillers include carbon-based fillers such as carbon black (e.g., Super P), graphite, carbon fiber, and the like. Other fillers include metallic fillers such as nickel, silver, copper, gold, platinum, iridium, iron, titanium, zinc, and the like. Metallic fillers also include alloys comprising such metals such as stainless steel, nichrome, and the like. Other fillers include metal oxide fillers such as silica, fumed silica, alumina, iron oxide, and the like. Other fillers include polymeric fillers such as those composed of a polyaryletherketone (e.g., polyetheretherketone (PEEK), polyetherketoneketone (PEKK)), a polyetherimide, and the like.

The morphology of the fillers is not particularly limited. The fillers may be particulate in form and have an aspect ratio of less than 2 (encompassing spherical shapes, elliptical shapes, and the like) or have an aspect ratio of greater than 2 (encompassing elongated shapes such as wires, rods, tubes, whiskers, fibers, needles, and the like). Similarly, the dimensions of the fillers are not particularly limited. The fillers may have a nanoscale dimension in which one, two, or all three dimensions are 1000 nm or less. The fillers may have a microscale dimension in which one, two, or all three dimensions are in a range of from 1 µm to 1 mm.

In embodiments, a filler is present in the phthalonitrile adhesive formulation at an amount in a range of from 0.001 weight % to 10 weight %, including from 0.01 weight % to 10 weight %, and from 0.1 weight % to 10 weight % as compared to the total weight of the adhesive formulation. When multiple fillers are used, these weight percentages refer to the total weight of the multiple fillers.

Other additives which may be included in the phthalonitrile adhesive formulations include dispersants, flow agents, cure promoters, surfactants, the like, and combinations thereof. Again, a variety of types of these components may be added to tune the properties of the adhesive formulation and the thermoset polymer formed therefrom. When present, they may be included in amounts described above with respect to the fillers.

In embodiments, the phthalonitrile adhesive formulation consists of one or more types of a phthalonitrile additive, one or more types of a bisphthalonitrile compound, and one or more types of a curing agent. In embodiments, the phthalonitrile adhesive formulation consists of one or more types of a phthalonitrile additive; one or more types of a bisphthalonitrile compound; one or more types of a curing agent; a prepolymer of the one or more types of the phthalonitrile additive, the one or more types of the bisphthalonitrile compound, and the one or more types of the curing agent; optionally, one or more types of a solvent; and optionally, one or more types of an additive. In these embodiments, any of the phthalonitrile additives, bisphthalonitrile compounds, curing agents, solvents, and additives disclosed above may be used in any combination without limitation.

Methods

The phthalonitrile adhesive formulations may be formed by combining and mixing the phthalonitrile additive, the bisphthalonitrile compound, the curing agent, and any other desired components at the desired amounts. The bisphthalonitrile compound and the curing agent may be provided together as part of a bisphthalonitrile composition, which may be commercially available, e.g., Bis A Oligomeric Phthalonitrile Composition from the Naval Research Laboratory. In embodiments, a phthalonitrile adhesive formulation may be formed by combining and mixing a prepolymer of the phthalonitrile additive, the bisphthalonitrile compound, the curing agent, a solvent, and optionally, an additive at the desired amounts. The prepolymer may be formed as described above and may refer to both crosslinked and uncrosslinked/unreacted components resulting from the partial curing as described above.

The phthalonitrile adhesive formulations may be used in a variety of environments, including the aerospace industry, the automobile industry, the submarine industry, the electronics industry, the construction industry, and the like. The adhesive formulations may be used to form a prepreg configured for use in any of these industries. Such a prepreg may be formed by impregnating a fibrous material with any of the present adhesive formulations. Any fibrous material may be used, e.g., glass fibers, carbon fibers, alumina fibers, ceramic fibers, the like, and combinations thereof. The fibrous material may be woven or nonwoven. The prepreg may be planar in form and multiple layers of prepreg may be stacked.

Figure 3:
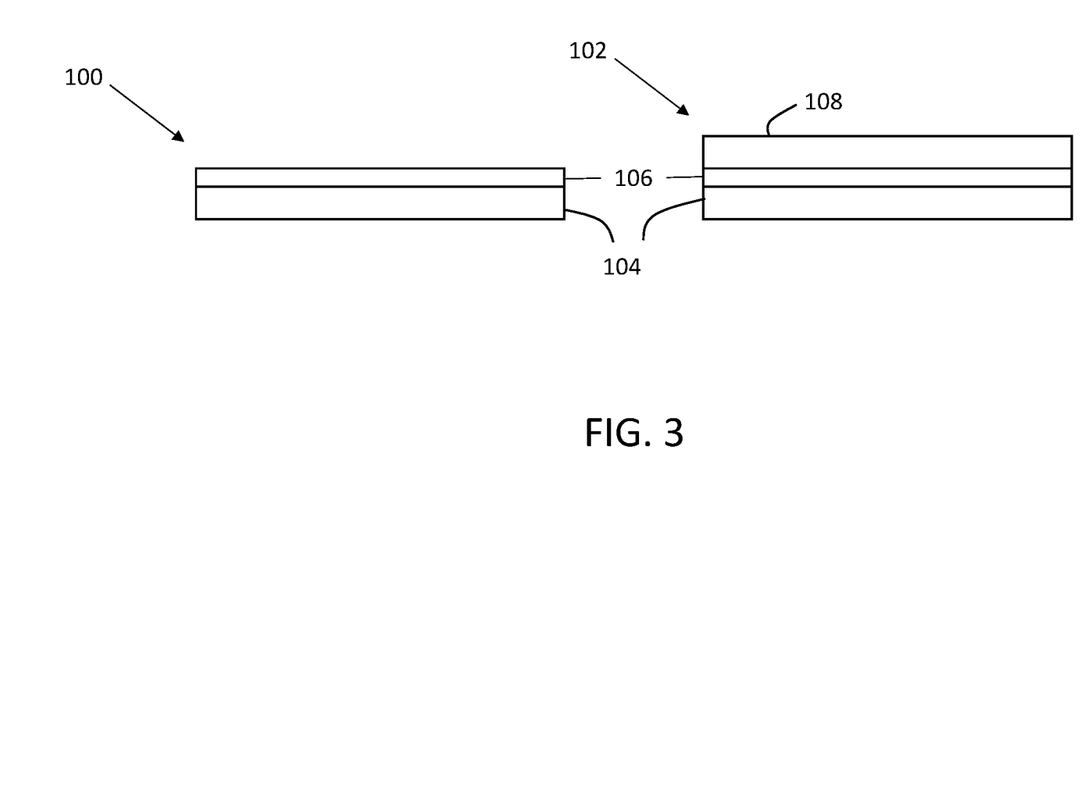
FIG. 3 shows schematics of illustrative adhesive articles which comprise any of the disclosed adhesive formulations.

In other embodiments, the adhesive formulations may be used to form an adhesive article configured to adhere components used in any of these industries. Such an adhesive article may be formed by applying a layer of any of the present adhesive formulations onto a surface of a substrate. Any substrate may be used, e.g., metal, glass, and the like. The applying step may be carried out using a variety of coating techniques, e.g., painting, brushing, spraying, wiping, and the like. The layer may have any desired thickness, e.g., in a range of from 0.5 mm to 100 mm. FIG. 3 shows two illustrative adhesive articles, 100 and 102. Both adhesive articles 100, 102 comprise a substrate 104 and a layer of an adhesive formulation 106 on a surface of the substrate 104. The adhesive article 102 further comprises an additional layer 108 which is adhered to the substrate 104 via the layer 106.

In whichever environment and for whichever application they are to be used, the phthalonitrile adhesive formulations are generally cured to form a thermoset polymer therefrom. Such curing involves heating the adhesive formulation for a period of time. The temperatures and/or times are greater than those used to achieve the partial curing described above so as to increase (e.g., maximize) the degree of crosslinking between phthalonitrile moieties. The curing may be carried out according to a curing profile involving holds at certain temperatures for certain periods of times. The curing profile may also involve use of certain heating rates to achieve the different temperatures. Various curing profiles may be used, depending upon the selected adhesive formulation and the desired properties for the thermoset polymer. An illustrative curing profile is provided in the Example, below. Another illustrative curing profile is 200° C. (30 minutes), 250° C. (90 minutes), 300° C. (180 minutes), 350° C. (90 minutes), 375° C. (60 minutes). The methods of using the adhesive formulations described above, e.g., to provide prepregs and adhesive articles, may further comprise curing to convert the adhesive formulation in the prepregs/adhesive articles to a thermoset polymer.

The prepregs, adhesive layers, and thermoset polymers formed using the methods described above are also encompassed by the present disclosure.

Properties

The present phthalonitrile adhesive formulations may be characterized by certain properties. Adhesive formulations comprising a solvent and a prepolymer of the phthalonitrile additive, the bisphthalonitrile compound, and the curing agent may be characterized by a shear viscosity measured as described in the Example below (see Table 4). In embodiments, the adhesive formulations exhibit a greater shear viscosity as compared to a comparative adhesive formulation which does not comprise the phthalonitrile additive (see Comparative Example 1.1). In embodiments, the shear viscosity is at least 1.5, at least 2, at least 2.5, or at least 3 times greater than such a comparative adhesive formulation. In embodiments, the shear viscosity is in a range of from 1,000 cP. to 100,000 cP. This includes from 2,000 cP to 50,000 cP and from 5,000 cP to 25,000 cP.

Thermoset polymers formed from the phthalonitrile adhesive formulations may also be characterized by certain properties, including thermooxidative stability. The thermooxidative stability may be referenced as a weight % of the thermoset polymer remaining after exposing the thermoset polymer to a temperature of about 399° C. in air for about 12 hours as described in the Example below (see Table 2).

In embodiments, the thermoset polymers exhibit a greater thermooxidative stability (a greater remaining weight %) as compared to a comparative thermoset polymer formed from a comparative adhesive formulation which does not comprise the phthalonitrile additive (see Comparative Example 1.1). In embodiments, the remaining weight % is at least 65%, at least 70%, or at least 75%.

Thermoset polymers formed from the phthalonitrile adhesive formulations may also be characterized by adhesive strength. Adhesive strength may be referenced as a maximum load measured as described in the Example below (see Table 3). In embodiments, the thermoset polymers exhibit the same (e.g., within ±5%) or greater maximum load as compared to a comparative thermoset polymer formed from a comparative adhesive formulation which does not comprise the phthalonitrile additive (see Comparative Example 1.1). In embodiments, the maximum load is in a range of from 300 psi to 6,000 psi. This includes from 300 psi to 3,000 psi and from 300 psi to 1,500 psi.

The properties described above serve to illustrate certain advantages of at least some of the present phthalonitrile adhesive formulations. Specifically, at least some provide thermoset polymers exhibiting improved thermooxidative stabilities and at least some adhesive formulations exhibit increased viscosity. The increased viscosity is useful for the coating techniques described above, particularly for vertical applications to reduce sagging. At the same time, at least some of the thermoset polymers formed from the adhesive formulations are able to maintain the same mechanical properties e.g., adhesive strength.

EXAMPLES

Provided herein are adhesive formulations and methods of making and using the adhesive formulations.

Materials

Bisphenol A oligomeric phthalonitrile composition (Bis A PN) containing 3% by weight of an amine catalyst (bis[4-(3-aminophenoxy)phenyl] sulfone, m-BAPS) was purchased from the Naval Research Laboratory and used as received. 4-methyl-2-pentanone (MIBK) and 2-butanone (MEK) were purchased from Sigma Aldrich and dried prior to use. Phenyl isocyanate, 4-aminophthalonitrile, 1,2-dicyanobenzene, potassium carbonate, 4-nitrophthalonitrile and phenol were purchased from Sigma Aldrich and used as received. Ketaspire KT-820 UFP was purchased from Solvay Specialty Polymers and used as received. Aerosil® R 972 fumed silica was purchased from Evonik Resource Efficiency GmbH and used as received.

Comparative Example 1.1: B-Staging of Bis A PN

A 6" diameter crystallization dish was lined with aluminum foil. To this dish, 50 g of the Bis A PN was poured into the crystallizing dish and spread evenly. The dish was placed in a 200° C. furnace in air and allowed to heat for 90 minutes. The crystallizing dish was then removed from the oven and allowed to quench cool at room temperature until it became a frangible solid (usually within 1 minute). The solid was then peeled off the aluminum foil and ground up using a mortar and pestle until it became a rough powder (Bis A prepolymer).

Comparative Example 1.2: Paste Formulation—Bis A PN 4.0 g of MIBK was added to a mixing cup along with three 0.2" diameter glass beads followed by 0.5 g Ketaspire KT-820 UFP, 0.01 g R972 fumed silica, and 5.5 g of the B-staged Bis A prepolymer powder (Comparative Example 1.1). This solution was mixed in a centrifugal mixer at 1500 rpm for 4 minutes. The cup was then sealed using parafilm and allowed to sit for 2 days. The resulting solution was a viscous paste that can be buttered onto substrates using a spatula or similar tool.

Comparative Example 2: Synthesis of 4-Phenylphthalonitrile (4PhPN)

To a 100 mL round-bottomed flask fitted with a nitrogen inlet and outlet, phenol (5.00 g, 53.13 mmol), 4-nitrophthalonitrile (9.20 g, 50.0 mmol), and potassium carbonate (10.37 g, 75.00 mmol) were charged and dissolved with DMF (60 mL). The resulting mixture was stirred at 80° C. for 12 h. The mixture was allowed to cool to ambient temperature and was poured into 5% aqueous HCl, resulting in the precipitation of a white solid. The material was collected using a Buchner funnel and the white solid was washed with water until neutral. The solvent was removed in vacuo to yield 4-phenylphthalonitrile (94% yield, 11.0 g).

Comparative Example 2.1: B-Staging of Bis A Containing 4PhPN (10 mol %)

A 6" diameter crystallization dish was lined with aluminum foil. Bis A PN (10 g) and 4PhPN (0.22 g) were poured into the crystallizing dish and spread evenly. The dish was placed in a 200° C. furnace in air and allowed to heat for 75 minutes. The crystallizing dish was then removed from the oven and allowed to quench cool at room temperature until it became a frangible solid (usually within 1 minute). The solid was then peeled off the aluminum foil and ground up using a mortar and pestle until it became a rough powder (Bis A—4 PhPN prepolymer).

Comparative Example 2.2: Paste Formulation—Bis A—4PhPN (10 mol %)

4.0 g of MIBK was added to a mixing cup along with three 0.2" diameter glass beads followed by 0.5 g Ketaspire KT-820 UFP, 0.01 g R972 fumed silica, and 5.5 g of the B-staged Bis A—4PhPN (10 mol %) prepolymer powder (Comparative Example 2.1). This solution was mixed in a centrifugal mixer at 1500 rpm for 4 minutes. The cup was then sealed using parafilm and allowed to sit for 2 days. The resulting solution was a viscous paste that can be buttered onto substrates using a spatula or similar tool.

Example 3: Synthesis of 4-Phenylureaphthalonitrile (4PhUrPN)

To a 100 mL round-bottomed flask fitted with a nitrogen inlet and outlet, 4-aminophthalonitrile (6.23 g, 43.52 mmol) and dry THF (75 mL) were added and mixed until dissolved. The resulting mixture was placed in an ice bath to cool to 0° C. Phenylisocyanate (5.184 g, 43.52 mmol) was slowly added to the stirred THF solution over 10 minutes. The reaction mixture was stirred at 0° C. for 30 minutes. The reaction flask was then removed from the ice bath and allowed to warm to room temperature over 60 min. The resulting mixture was precipitated into hexanes forming a fluffy white precipitate. The powder was collected using a Buchner funnel and the white solid was washed with hexanes (3×20 mL). The solvent was removed in vacuo to yield 4-phenylureaphthalonitrile (95% yield, 10.8 g).

Example 3.1: B-Staging of Bis A—4PhUrPN (10 mol %)

A 6" diameter crystallization dish was lined with aluminum foil. Bis A PN (10 g) and 4PhUrPN (0.28 g) were poured into the crystallizing dish and spread evenly. The dish was placed in a 200° C. furnace in air and allowed to heat for 90 minutes. The crystallizing dish was then removed from the oven and allowed to quench cool at room temperature until it became a frangible solid (usually within 1 minute). The solid was then peeled off the aluminum foil and ground up using a mortar and pestle until it became a rough powder (Bis A—4 PhUrPN prepolymer).

Example 3.2: Paste Formulation—Bis A—4PhUrPN (10 mol %)

4.0 g of MIBK was added to a mixing cup along with three 0.2" diameter glass beads followed by 0.5 g Ketaspire KT-820 UFP, 0.01 g R972 fumed silica, and 5.5 g of the Bis A—4PhUrPN (10%) prepolymer powder (Example 3.1). This solution was mixed in a centrifugal mixer at 1500 rpm for 4 minutes. The cup was then sealed using parafilm and allowed to sit for 2 days. The resulting solution was a viscous paste that can be buttered onto substrates using a spatula or similar tool.

Example 4.1: B-Staging of Bis A—1,2-dicyanobenzene (DCB)—(10 mol %)

A 6" diameter crystallization dish was lined with aluminum foil. Bis A PN (10 g) and DCB (0.13 g) were poured into the crystallizing dish and spread evenly. The dish was placed in a 200° C. furnace in air and allowed to heat for 90 minutes. The crystallizing dish was then removed from the oven and allowed to quench cool at room temperature until it became a frangible solid (usually within 1 minute). The solid was then peeled off the aluminum foil and ground up using a mortar and pestle until it became a rough powder (Bis A—DCB prepolymer).

Example 5.1: B-Staging of Bis A—4-Aminophthalonitrile (4-AmPN)—(10 mol %)

A 6" diameter crystallization dish was lined with aluminum foil. Bis A PN (10 g) and 4 AmPN (0.13 g) were poured into the crystallizing dish and spread evenly. The dish was placed in a 200° C. furnace in air and allowed to heat for 90 minutes. The crystallizing dish was then removed from the oven and allowed to quench cool at room temperature until it became a frangible solid (usually within 1 minute). The solid was then peeled off the aluminum foil and ground up using a mortar and pestle until it became a rough powder (Bis A—4-AmPN prepolymer).

Example 6: Synthesis of TDI-Bisureaphthalonitrile (TDI-BisPN)

To a 100 mL round-bottomed flask fitted with a nitrogen inlet and outlet, 4-aminophthalonitrile (12.46 g, 87.04 mmol) and dry THF (75 mL) were added and mixed until dissolved. The resulting mixture was placed in an ice bath to cool to 0° C. Toluene diisocyanate (7.58 g, 43.52 mmol) was slowly added to the stirred THF solution over 10 minutes. The reaction mixture was stirred at 0° C. for 30 minutes. The reaction flask was then removed from the ice bath and allowed to warm to room temperature over 60 min. The mixture was precipitated into hexanes forming a fluffy white precipitate. The powder was collected using a Buchner funnel and the white solid was washed with hexanes (3×20 mL). The solvent was removed in vacuo to yield TDI-BisPN (93% yield, 18.6 g).

Example 6.1: B-Staging of Bis A—TDI-BisPN (20 mol %)

A 6" diameter crystallization dish was lined with aluminum foil. Bis A PN (10 g) and TDI-BisPN (1.06 g) were poured into the crystallizing dish and spread evenly. The dish was placed in a 200° C. furnace in air and allowed to heat for 90 minutes. The crystallizing dish was then removed from the oven and allowed to quench cool at room temperature until it became a frangible solid (usually within 1 minute). The solid was then peeled off the aluminum foil and ground up using a mortar and pestle until it became a rough powder (Bis A—TDI-BisPN prepolymer).

Example 6.2: Paste Formulation—Bis A—TDI-BisPN (20 mol %)

4.0 g of MIBK was added to a mixing cup along with three 0.2" diameter glass beads followed by 0.5 g Ketaspire KT-820 UFP, 0.01 g R972 fumed silica, and 5.5 g of the Bis A—TDI-BisPN (20 mol %) prepolymer powder (Example 6.1). This solution was mixed in a centrifugal mixer at 1500 rpm for 4 minutes. The cup was then sealed using parafilm and allowed to sit for 2 days. The resulting solution was a viscous paste that can be buttered onto substrates using a spatula or similar tool.

Example 7: Synthesis of MDI-Bisureaphthalonitrile (MDI-BisPN)

To a 100 mL round-bottomed flask fitted with a nitrogen inlet and outlet, 4-aminophthalonitrile (12.46 g, 87.04 mmol) and dry THF (75 mL) were added and mixed until dissolved. The resulting mixture was placed in an ice bath to cool to 0° C. Methylene diphenyl diisocyanate (MDI) (10.89 g, 43.52 mmol), was slowly added to the stirred THF solution over 10 minutes. The reaction mixture was stirred at 0° C. for 30 minutes. The reaction flask was then removed from the ice bath and allowed to warm to room temperature over 60 min. The mixture was precipitated into hexanes forming a fluffy white precipitate. The powder was collected using a Buchner funnel and the white solid was washed with hexanes (3×20 mL). The solvent was removed in vacuo to yield MDI-BisPN (94% yield, 21.95 g).

Example 7.1: B-Staging of Bis A—1MDI-BisPN (20 mol %)

A 6" diameter crystallization dish was lined with aluminum foil. Bis A PN (10 g) and MDI-BisPN (1.23 g) were poured into the crystallizing dish and spread evenly. The dish was placed in a 200° C. furnace in air and allowed to heat for 90 minutes. The crystallizing dish was then removed from the oven and allowed to quench cool at room temperature until it became a frangible solid (usually within 1 minute). The solid was then peeled off the aluminum foil and ground up using a mortar and pestle until it became a rough powder (Bis A—MDI-BisPN prepolymer).

Example 7.2: Paste Formulation—Bis A—1MDI-BisPN (20 mol %)

4.0 g of MIBK was added to a mixing cup along with three 0.2" diameter glass beads followed by 0.5 g Ketaspire KT-820 UFP, 0.01 g R972 fumed silica, and 5.5 g of the Bis A—MDI-BisPN (20%) prepolymer powder (Example 7.1). This solution was mixed in a centrifugal mixer at 1500 rpm for 4 minutes. The cup was then sealed using parafilm and allowed to sit for 2 days. The resulting solution was a viscous paste that can be buttered onto substrates using a spatula or similar tool.

Example 8.1: B-Staging of Bis A—2MDI-BisPN (30 mol %)

A 6" diameter crystallization dish was lined with aluminum foil. Bis A PN (10 g) and MDI-BisPN (2.12 g) were poured into the crystallizing dish and spread evenly. The dish was placed in a 200° C. furnace in air and allowed to heat for 90 minutes. The crystallizing dish was then removed from the oven and allowed to quench cool at room temperature until it became a frangible solid (usually within 1 minute). The solid was then peeled off the aluminum foil and ground up using a mortar and pestle until it became a rough powder (Bis A—MDI-BisPN-2 prepolymer).

Example 9: Post Curing

Samples were cured under nitrogen in a box furnace using the following cure schedule: 200° C. (90 minutes), 250° C. (6 hours), 300° C. (3 hours), 350° C. (3 hours), 375° C. (6 hours).

Thermooxidative Stability Testing

Thermooxidative stability measurements were carried out using a thermogravimetric analyzer (TGA Q500) according to the manufacturer's operating instructions. The measurements were carried out on samples (indicated in Table 1, below) that were subjected to curing as set forth in Example 9. Samples of 10-15 mg were evaluated using a 10° C./min temperature ramp from ambient temperature to 1000° C. in air. The results are shown in Table 1, below. For long term thermal stability measurements, samples of 10-15 mg were evaluated using a 25° C./min temperature ramp from ambient temperature to 399° C. followed by 12 hours at 399° C. in air. These conditions are more representative of actual conditions. The results are shown in Table 2, below. The results of Table 2 show that the phthalonitrile additives of Examples 3.1 and 4.1 greatly improve long term thermal stability.

TABLE 1

Thermooxidative stability following 10° C./min temperature ramp to 1000° C. $T_{d,5\%}$ is the temperature at which 5% mass loss occurs.

| Example | Degradation temperature ($T_{d,5\%}$ ° C.) |
| --- | --- |
| Comparative 1.1 | 509 |
| Comparative 2.1 | 534 |
| 3.1 | 515 |
| 4.1 | 503 |
| 5.1 | 485 |
| 6.1 | 489 |

TABLE 1-continued

Thermooxidative stability following 10° C./min temperature ramp to 1000° C. $T_{d,5\%}$ is the temperature at which 5% mass loss occurs.

| Example | Degradation temperature ($T_{d,5\%}$ ° C.) |
| --- | --- |
| 7.1 | 511 |
| 8.1 | 502 |

TABLE 2

Long term thermal stability following a 12 hour hold at 399° C. in air.

| Example | Weight Remaining (%) |
| --- | --- |
| Comparative 1.1 | 63 |
| Comparative 2.1 | 35 |
| 3.1 | 65 |
| 4.1 | 73 |
| 5.1 | 31 |

Lap-Shear Testing

Lap-shear panels (single-lap-joint) were prepared for Comparative Example 1.2, Comparative Example 2.2, and Example 3.2. Samples were made with primed (Pasa Jell 107 and BR 680) titanium coupons (1"×4"×0.063") utilizing a 1"×1" adhesive contact area. A thin layer of the paste was spread on both sides of the corresponding coupon set and a 1 mil glass scrim was added in the center of one coupon to control the bondline thickness. The corresponding panels were then aligned by hand and firmly pressed together to create a single-lap-joint panel. Each panel was appropriately balanced (including top weight) and placed in a furnace (nitrogen purged). The samples were then post cured according to Example 9. Lap-shear testing was performed with an Instron 5969 mechanical tester using a crosshead speed of 0.05 in/min and otherwise in accordance with the manufacturer's operating instructions. Four coupons of each paste were tested and the results are shown in Table 3. The results of Table 3 show that the phthalonitrile additive of Example 3.2 does not degrade adhesive strength while also greatly improving thermal stability (Table 2). In other words, this indicates that the present phthalonitrile additives can improve thermal performance while sustaining mechanical performance.

TABLE 3

Lap-shear results.

| Example | Average Maximum Load (ksi) (n = 4) |
| --- | --- |
| Comparative 1.2 | 0.56 ± 0.07 |
| Comparative 2.2 | 0.47 ± 0.04 |
| 3.2 | 0.56 ± 0.16 |
| 4.2 | 0.36 ± 0.05 |

Rheological Testing

Shear viscosity was measured for Comparative Example 1.2, Comparative Example 2.2, and Example 3.2 (prior to curing according to Example 9). These measurements were taken with a Malvern viscometer using a parallel plate method (25 mm plate, 0.20 mm gap) with a shear rate range from 0.1 Hz to 1000 Hz and otherwise in accordance with the manufacturer's operating instructions. The results are shown in Table 4. The results of Table 4 show that the phthalonitrile additive of Example 3.2 greatly increases viscosity. This indicates that the present phthalonitrile additives can increase viscosity of the adhesive formulations which is advantageous for coating applications.

TABLE 4

Shear viscosity results.

| Example | Shear Viscosity (cP) @ ~100 Hz |
|---|---|
| Comparative 1.2 | 10,000 |
| Comparative 2.2 | 4,000 |
| 3.2 | 26,500 |

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. An adhesive formulation comprising:
    (a) a phthalonitrile additive selected from a group consisting of 1,2-dicyanobenzene; a derivative of 1,2-dicyanobenzene; and combinations thereof;
    (b) a bisphthalonitrile compound; and
    (c) a curing agent,
    wherein the phthalonitrile additive does not comprise an ether functional group and does not comprise a thioether functional group.

2. The adhesive formulation of claim 1, wherein the phthalonitrile additive is the derivative of 1,2-dicyanobenzene and the derivative comprises at least one phthalonitrile moiety and a functional group comprising a hydrogen bond donor, wherein the functional group is directly covalently bound to the benzene of the at least one phthalonitrile moiety.

3. The adhesive formulation of claim 2, wherein the hydrogen bond donor is an N-H bond of the functional group and the N of the N-H bond is directly covalently bound to the benzene of the at least one phthalonitrile moiety.

4. The adhesive formulation of claim 3, wherein the functional group comprises an amine group; an amide group; an oxalamide group; a urea group; a urethane group; or combinations thereof.

5. The adhesive formulation of claim 4, wherein the functional group is monofunctional.

6. The adhesive formulation of claim 4, wherein the functional group is multifunctional comprising one or more of the amine group; the amide group; the oxalamide group; the urea group; the urethane group; or combinations thereof.

7. The adhesive formulation of claim 1, wherein the phthalonitrile additive comprises a single phthalonitrile moiety or two phthalonitrile moieties.

8. The adhesive formulation of claim 1, wherein the phthalonitrile additive is selected from a group consisting of 1,2-dicyanobenzene; 4-aminophthalonitrile; 4-phenylureaphthalonitrile; toluene bisureaphthalonitrile; methylene diphenylureaphthalonitrile; and combinations thereof.

9. The adhesive formulation of claim 1, wherein the phthalonitrile additive is present in the adhesive formulation at an amount in a range of from 2 mol % to 30 mol %.

10. The adhesive formulation of claim 1, wherein the bisphthalonitrile compound is an oligomer.

11. The adhesive formulation of claim 1, wherein the bisphthalonitrile compound comprises an aromatic ether linking group and a ketone linking group.

12. The adhesive formulation of claim 11, wherein the aromatic ether linking group is provided by a bisphenol and the ketone linking group is provided by a benzophenone.

13. The adhesive formulation of claim 1, wherein a portion of phthalonitrile moieties in the adhesive formulation are crosslinked to form a prepolymer of the phthalonitrile additive and the bisphthalonitrile compound in the adhesive formulation.

14. An adhesive formulation comprising:
    (a) a phthalonitrile additive selected from a group consisting of 1,2-dicyanobenzene; a derivative of 1,2-dicyanobenzene; and combinations thereof;
    (b) a bisphthalonitrile compound;
    (c) a curing agent;
    (d) a prepolymer of the phthalonitrile additive and the bisphthalonitrile compound; and
    (e) a solvent,
    wherein the phthalonitrile additive does not comprise an ether functional group and does not comprise a thioether functional group.

15. The adhesive formulation of claim 14, wherein the phthalonitrile additive is the derivative of 1,2-dicyanobenzene and the derivative comprises at least one phthalonitrile moiety and a functional group comprising a hydrogen bond donor, wherein the functional group is directly covalently bound to the benzene of the at least one phthalonitrile moiety.

16. The adhesive formulation of claim 15, wherein the hydrogen bond donor is an N-H bond of the functional group and the N of the N-H bond is directly covalently bound to the benzene of the at least one phthalonitrile moiety.

17. The adhesive formulation of claim 14, wherein the prepolymer, together with the phthalonitrile additive, the bisphthalonitrile compound, and the curing agent, are present at an amount in a range of from 25 weight % to 80 weight %.

18. The adhesive formulation of claim 14, further comprising an additive selected from a group consisting of a filler, a dispersant, a flow agent, a cure promoter, and a surfactant.

19. A prepreg comprising a fibrous material and the adhesive formulation of claim 14 impregnated into the fibrous material.

20. An adhesive article comprising a substrate and a layer of the adhesive formulation of claim 14 on a surface of the substrate.

21. A thermoset polymer formed by curing the adhesive formulation of claim 1.

22. A thermoset polymer formed by curing the adhesive formulation of claim 14.

23. A method of using an adhesive formulation, the method comprising:
    heating the adhesive formulation of claim 1 at a temperature and for a period of time to achieve partial curing of the phthalonitrile additive and the bisphthalonitrile compound to form a prepolymer; and adding a solvent.

24. A method of using an adhesive formulation, the method comprising heating the adhesive formulation of claim 14 according to a curing profile to form a thermoset polymer.

25. The adhesive formulation of claim 1, wherein the phthalonitrile additive is selected from a group consisting of 4-aminophthalonitrile; 4-phenylureaphthalonitrile; toluene bisureaphthalonitrile; methylene diphenylureaphthalonitrile; and combinations thereof.

26. The adhesive formulation of claim 1, wherein the phthalonitrile additive is 4-phenylureaphthalonitrile.

27. The adhesive formulation of claim 14, wherein the phthalonitrile additive is selected from a group consisting of 4-aminophthalonitrile; 4-phenylureaphthalonitrile; toluene bisureaphthalonitrile; methylene diphenylureaphthalonitrile; and combinations thereof.

28. The adhesive formulation of claim 14, wherein the phthalonitrile additive is 4-phenylureaphthalonitrile.

\* \* \* \* \*